(12) United States Patent
Totolos, Jr. et al.

(10) Patent No.: US 8,874,822 B2
(45) Date of Patent: *Oct. 28, 2014

(54) SCHEDULING ACCESS REQUESTS FOR A MULTI-BANK LOW-LATENCY RANDOM READ MEMORY DEVICE

(71) Applicant: NetApp, Inc., Sunnyvale, CA (US)

(72) Inventors: George Totolos, Jr., Cranberry Township, PA (US); Nhiem T. Nguyen, Cranberry Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,413

(22) Filed: Jul. 15, 2013

(65) Prior Publication Data

US 2013/0304988 A1 Nov. 14, 2013

Related U.S. Application Data

(63) Continuation of application No. 12/430,776, filed on Apr. 27, 2009, now Pat. No. 8,510,496.

(51) Int. Cl.
*G06F 12/06* (2006.01)
*G06F 13/00* (2006.01)
*G06F 13/28* (2006.01)
*G06F 3/06* (2006.01)

(52) U.S. Cl.
CPC .............. *G06F 3/0631* (2013.01); *G06F 13/28* (2013.01); *G06F 3/0613* (2013.01); *G06F 12/06* (2013.01); *G06F 13/00* (2013.01); *G06F 3/0689* (2013.01)
USPC ............... 711/5; 711/148; 711/150; 711/151; 711/158; 711/167; 711/168; 711/169; 711/147

(58) Field of Classification Search
CPC ..... G06F 13/28; G06F 3/0613; G06F 3/0631; G06F 12/06; G06F 13/00; G06F 3/0689
USPC ......... 711/147, 148, 150, 151, 158, 167, 168, 711/169, 5
See application file for complete search history.

(56) References Cited

U.S. PATENT DOCUMENTS

| 6,434,641 | B1 * | 8/2002 | Haupt et al. ................... 710/54 |
| 7,296,112 | B1 * | 11/2007 | Yarlagadda et al. .......... 711/105 |
| 8,510,496 | B1 * | 8/2013 | Totolos et al. ................... 711/5 |
| 2006/0129740 | A1 * | 6/2006 | Ruckerbauer et al. ............ 711/5 |
| 2009/0044189 | A1 * | 2/2009 | Mutlu et al. ................... 718/102 |
| 2009/0138670 | A1 * | 5/2009 | Mutlu et al. ................... 711/167 |

OTHER PUBLICATIONS

U.S. Appl. No. 12/430,776, filed Apr. 27, 2009, titled "Scheduling Access Requests for a Multi-Bank Low-Latency Random Read Memory Device". Inventors: George Totolos, Jr. and Nhiem T. Nguyen.

* cited by examiner

*Primary Examiner* — J. H. Hur
(74) *Attorney, Agent, or Firm* — Kacvinsky Daisak Bluni PLLC

(57) ABSTRACT

Described herein are method and apparatus for scheduling access requests for a multi-bank low-latency random read memory (LLRRM) device within a storage system. The LLRRM device comprising a plurality of memory banks, each bank being simultaneously and independently accessible. A queuing layer residing in storage system may allocate a plurality of request-queuing data structures ("queues"), each queue being assigned to a memory bank. The queuing layer may receive access requests for memory banks in the LLRRM device and store each received access request in the queue assigned to the requested memory bank. The queuing layer may then send, to the LLRRM device for processing, an access request from each request-queuing data structure in successive order. As such, requests sent to the LLRRM device will comprise requests that will be applied to each memory bank in successive order as well, thereby reducing access latencies of the LLRRM device.

18 Claims, 14 Drawing Sheets

SCHEDULING ACCESS REQUESTS FOR A MULTI-BANK LOW-LATENCY RANDOM READ MEMORY DEVICE

RELATED APPLICATIONS

This patent application claims benefit to and is a continuation of the United States Patent Application entitled "SCHEDULING ACCESS REQUESTS FOR A MULTI-BANK LOW-LATENCY RANDOM READ MEMORY DEVICE," having Ser. No. 12/430,776, filed on Apr. 27, 2009, which is expressly incorporated herein by reference.

FIELD OF THE INVENTION

The present invention relates to storage systems, and particularly, to scheduling access requests for a multi-bank low-latency random read memory device.

BACKGROUND OF THE INVENTION

A storage system is a processing system adapted to store and retrieve data on storage devices (such as disks). The storage system includes a storage operating system that implements a file system to logically organize the data as a hierarchical structure of directories and files on the storage devices. Each file may be implemented as a set of blocks configured to store data (such as text), whereas each directory may be implemented as a specially-formatted file in which data about other files and directories are stored. The storage operating system may assign/associate a unique storage system address (e.g., logical block number (LBN)) for each data block stored in the storage system.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

The storage system may typically implement large capacity disk devices for storing large amounts of data. In conjunction with the large capacity disk devices, the storage system may also store data on other storage devices, such as low-latency random read memory (referred to herein as "LLRRM"). When using LLRRM devices in conjunction with disk devices to store data, the storage system may map storage system addresses (e.g., LBNs) to LLRRM addresses to access data on the LLRRM devices. As densities of LLRRM devices (e.g., flash memory) increase to provide larger storage capacities (while prices of LLRRM devices continue to decrease), LLRRM devices are being integrated into applications demanding such higher capacities, including integration into computer server and solid state drive applications.

Typically, large capacity LLRRM devices incorporate multiple banks of discrete memory devices, each bank being simultaneously and independently accessible. At the same time, the multiple banks are also typically concatenated or otherwise organized to operate as a single memory device of greater capacity. Conventional storage architectures may implement such multi-bank LLRRM devices using a single physical memory interface (e.g., a serial interface, a USB bus or a controller interface). As the number of banks and the storage capacity of the LLRRM device increases, however, conventional storage architectures may exhibit decreasing data access performance (e.g., as measured by bandwidth over capacity). As such, there is a need for a more efficient method and apparatus for accessing data of a large capacity multi-bank LLRRM device.

SUMMARY OF THE INVENTION

Described herein are method and apparatus for scheduling access requests for a multi-bank low-latency random read memory (LLRRM) device for using the LLRRM device in a storage system. The LLRRM device may comprise a plurality of memory banks, each memory bank having an associated LLRRM address range, each memory bank being simultaneously and independently accessible for accessing data stored on the memory bank. A queuing layer residing in an operating system of the storage system may allocate a plurality of request-queuing data structures, each request-queuing data structure being assigned to a memory bank. The queuing layer may receive access requests for memory banks in the LLRRM device and store/queue each received access request in the request-queuing data structure assigned to the requested memory bank. The queuing layer may then send, to the LLRRM device for processing, an access request from each request-queuing data structure in successive order. As such, requests sent to the LLRRM device will comprise requests that will be applied to each memory bank in successive order as well, thereby reducing idle time of the banks and reducing access latencies of the LLRRM device.

For example, the queuing layer may be configured to recognize the specific configuration of memory banks in the LLRRM device and store/queue a received access request for a particular bank behind other access requests corresponding to the same bank so as not to block requests corresponding to unrelated banks. Further, the queuing layer may be configured to recognize the idle/not-idle state of the LLRRM memory banks such that the queuing layer may dispatch to the LLRRM device access requests from any queue in a scheduled order, thereby reducing idle time of the banks and reducing access latencies of the LLRRM device.

For example, the plurality of memory banks comprises first, second, and third memory banks, the first memory bank having an allocated first request-queuing data structure ("queue"), the second memory bank having an allocated second queue, and the third memory bank having an allocated third queue. The queuing layer may then send, to the LLRRM device, requests from each queue in a scheduled order, whereby the scheduled order is determined at least partially based on the idle/not-idle state of the LLRRM memory bank corresponding to the queue. For example, the queuing layer may combine idle/not-idle state with a circular polling technique in order to dispatch an awaiting and ready access request in a queue to a corresponding memory bank, and proceed to poll the next queue for an awaiting and ready access request, and dispatching that access request to the corresponding memory bank and so on continually. In this way, the queuing layer may continually dispatch to the LLRRM device a next awaiting access request in a queue to the corresponding and ready memory bank in the LLRRM device, thereby reducing idle time of the banks and reducing access latencies of the LLRRM device.

In some embodiments, a request-sorting data structure is used to sort/map received access requests to the appropriate request-queuing data structure. The request-sorting data structure may comprise a plurality of sorting entries representing the plurality of request-queuing data structures. For each request-queuing data structure, a sorting entry may comprise an LLRRM address range field, a request type identifier (read/write identifier) field, and a request-queuing data structure identifier ("queue identifier") field.

In some embodiments, each request-queuing data structure stores read and write requests for an assigned bank. In these embodiments, only the requested LLRRM address of the received access request and the LLRRM address range field is used to determine the queue identifier of the request-queuing data structure that is to store/queue the received access request. In other embodiments, each request-queuing data structure stores only read requests or only write requests for an assigned bank(s). In these embodiments, the requested LLRRM address of the received access request and the LLRRM address range field, as well as the request type identifier field is used to determine the queue identifier of the request-queuing data structure that is to store/queue the received access request. By providing separate request-queuing data structures for write requests, pending read requests can be processed by the LLRRM device with high priority, and without waiting behind higher-latency write requests.

BRIEF DESCRIPTION OF THE DRAWINGS

The novel features are set forth in the appended claims. However, for purpose of explanation, several embodiments of the invention are set forth in the following figures.

DETAILED DESCRIPTION

The disclosure of United States Patent Application entitled "SCHEDULING ACCESS REQUESTS FOR A MULTI-BANK LOW-LATENCY RANDOM READ MEMORY DEVICE," having Ser. No. 12/430,776, filed on Apr. 27, 2009, is expressly incorporated herein by reference.

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into four sections: Section I describes a storage system environment in which some embodiments operate. Section II describes a storage operating system engine having a queuing layer for using a low-latency random read memory device (LLRRM) as a storage device in a storage system. Section III describes a system for scheduling access requests for a multi-bank LLRRM device. Section IV describes a messaging protocol and methods for scheduling access requests for a multi-bank LLRRM device used in a storage system.

I. Storage System Environment

Figure 1:
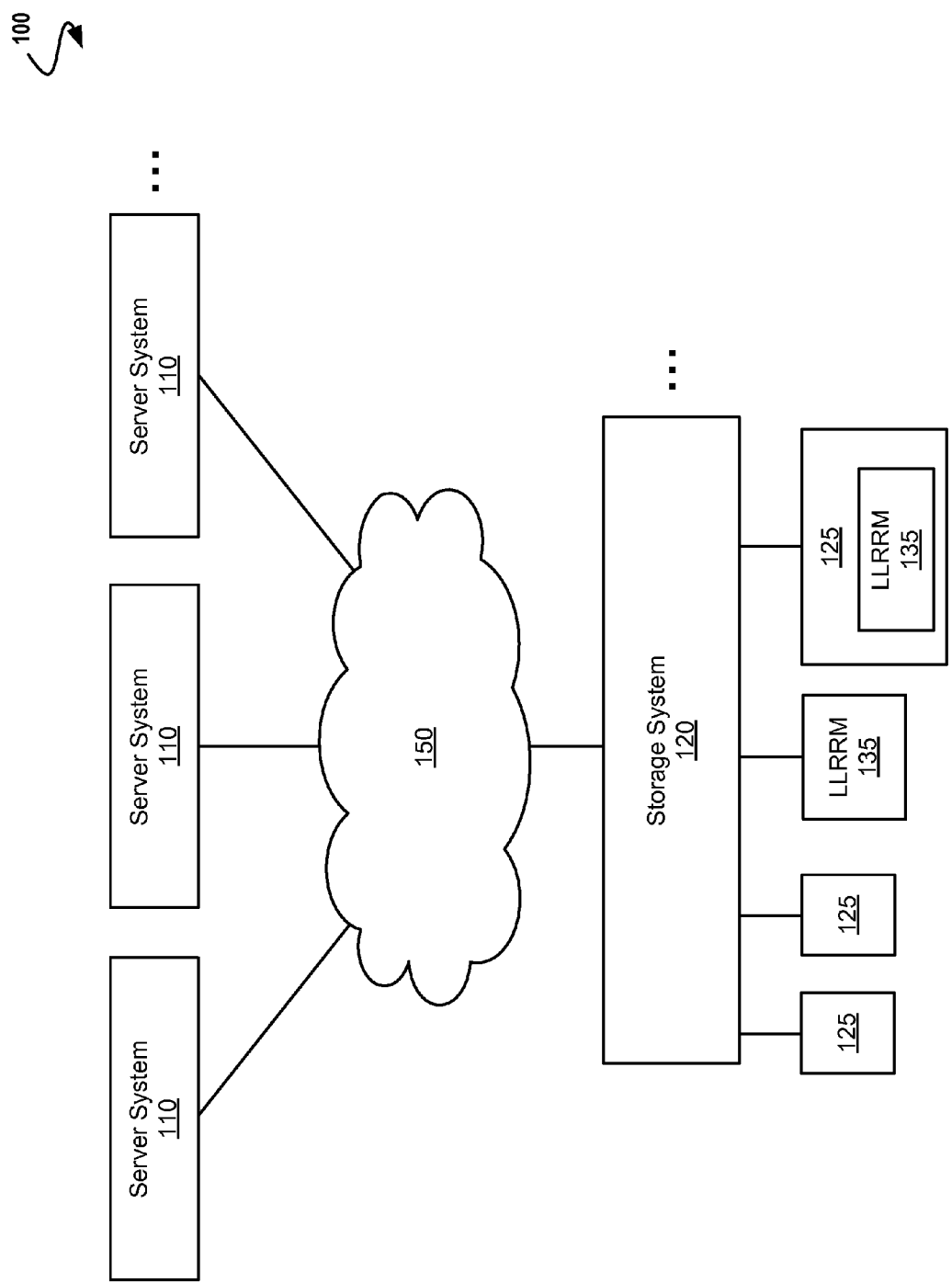
FIG. 1 is a schematic block diagram of an exemplary storage system environment, in which some embodiments operate.

FIG. 1 is a schematic block diagram of an exemplary storage system environment 100, in which some embodiments operate. The environment 100 comprises a one or more server systems 110 and a storage system 120 that are connected via a connection system 150. The storage system 120 may comprise a set of storage devices, such as one or more primary storage devices 125 and/or one or more secondary storage devices 135. The connection system 150 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the storage system 120 to store and manage data in the storage devices of the storage system 120. A server system 110 may execute one or more applications that submit access requests for accessing particular data on the storage devices 125 and/or 135 of the storage system 120. Interaction between a server system 110 and the storage system 120 can enable the provision of storage services. That is, server system 110 may request the services of the storage system 120 (e.g., through read or write requests), and the storage system 120 may return the results of the services requested by the server system 110, by exchanging packets over the connection system 150.

The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of one or more primary storage devices 125. A primary storage device 125 may comprise a writable storage device media, such as magnetic disks, video tape, optical, DVD, magnetic tape, and any other similar media adapted to store information (including data and parity information). For illustrative purposes, the primary storage device 125 is sometimes described herein as a disk. In some embodiments, the storage system 120 also stores data in a set of one or more secondary storage devices 135, a secondary storage device 135 comprising an LLRRM device. The storage system 120 may use the LLRRM devices 135 in conjunction with the primary storage devices 125 to store data. In other embodiments, the storage system 120 may use only the LLRRM devices 135 to store data without use of the primary storage devices 125.

The LLRRM device may comprise a separate (stand-alone) storage device 135 or may be integrated as part of a primary storage device 125 (such as a hybrid drive comprising an LLRRM and a magnetic storage combined in a single device). As discussed below in relation to FIG. 2, an LLRRM device may also reside in the storage system's internal architecture and be connected with the system bus (e.g., as an LLRRM module on a card). The queuing layer 276 may utilize the LLRRM in a similar manner, regardless of the configuration or location of the LLRRM, so that the LLRRM device(s) 135 and/or primary storage device(s) 125 operate together in a way that is transparent to applications accessing data stored on the storage system 120. In some embodiments, a software layer or a module (e.g., queuing layer 276) may comprise an engine comprising firmware or software and hardware configured to perform embodiments described herein. In general, functions of a software layer or module described herein may be embodied directly in hardware, or embodied as software executed by a processor, or embodied as a combination of the two.

In some embodiments, an LLRRM comprises a non-volatile, rewritable computer memory (i.e., a computer memory that does not require power to maintain information stored in the computer memory and may be electrically erased and reprogrammed) having lower latency in performing random-read requests relative to disk devices. As known in the art, a disk device comprises mechanical moving components for reading and writing data (such as platters and the read/write head). In some embodiments, an LLRRM device comprises a non-volatile rewritable solid state memory device having no mechanical moving parts for reading and writing data. Some examples of LLRRM devices include flash memory, non-volatile random access memory (NVRAM), Magnetic Random Access Memory (MRAM), Phase Change RAM (PRAM), etc. In other embodiments, other LLRRM devices are used other than those listed here.

Although LLRRM may be more costly (for a given amount of data storage) than disk devices, data may be accessed on an LLRRM with higher performance (e.g., lower power consumption and/or lower latency) than on disk devices. In some embodiments, LLRRM 135 may be used as a permanent storage device (alone or in conjunction with primary storage devices 125), rather than as a temporary storage device (e.g., as a cache device).

The storage system 120 may implement a file system to logically organize the data as a hierarchical structure of directories and files on each primary and secondary storage device 125 and 135. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125. The block may vary widely in data size (e.g., 1 byte, 4 kilobytes (KB), 8 KB, etc.).

The storage operating system may assign/associate a unique storage system address (e.g., logical block number (LBN)) for each data block stored in the storage system. The unique storage system address for a data block may be used by the storage operating system to locate and access (read/write) the data block. In some embodiments, the unique storage system address is referred to as a logical block number (LBN) or a logical block address (LBA). In other embodiments, the storage system address may be expressed in any variety of forms (e.g., logical volume block number, etc.), as long as the storage system address uniquely identifies an address of a data block.

When implementing one or more LLRRM devices 135 for storing data, the storage system 120 may map storage system addresses to LLRRM addresses for locating and accessing data stored on the LLRRM devices 135. The storage system addresses may be used by the file system to locate and access data blocks of the file system, whereas LLRRM addresses may be used by the LLRRM devices 135 to locate and access data blocks stored on the LLRRM devices 135. The LLRRM devices 135 may receive LLRRM addresses and access data on the LLRRM devices 135 by implementing a sub-system for performing various input/output operations (such as reading, writing, or erasing data, etc.). The sub-system may comprise a device driver, file system, and/or other software layers for performing the various input/output operations.

Conventionally, a storage system manages access requests (read/write requests) for each LLRRM device using a single access request queue, whereby all access requests received from client are stored in the single queue and forwarded to the LLRRM off the single queue. Such conventional queuing of data access requests are simple in implementation and sufficient for LLRRM devices having relatively small storage capacities. However, as LLRRM devices having more memory banks and larger storage capacities are deployed, using a single request queue degrades performance as the simultaneous and independent operation of the multiple banks is not leveraged.

Figure 2:
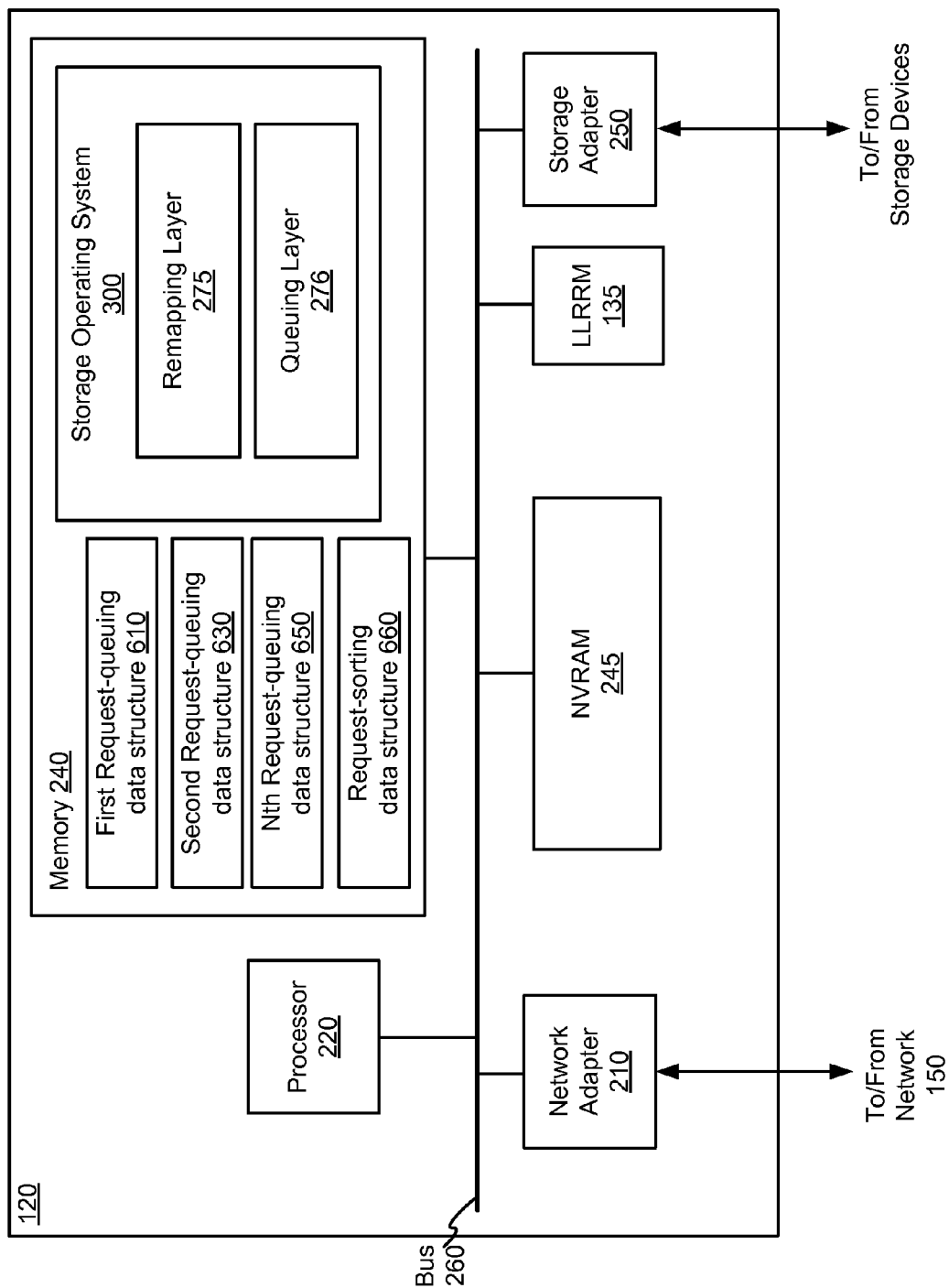
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. In some embodiments, the storage system 120 further comprises an LLRRM device 135 that resides in the storage system's internal architecture and is connected with the system bus 260. For example, the LLRRM device 135 may be an LLRRM module on a Peripheral Component Interconnect (PCI) or PCI eXtended (PCI-X) card that is connected with the system bus 260. As another example, an LLRRM device 135 may be accessed over a storage adapter 250 that couples to the storage devices 135 and 125 (see FIG. 1) over an IO interconnect arrangement, such as a conventional high-performance, Fibre Channel serial link topology.

The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g., an LLRRM), that holds the last state of the memory in the event of any power loss to the array. Therefore, even if an access request stored in memory 240 is lost or erased (e.g., due to a temporary power outage) it still may be recovered from the NVRAM 245. In other embodiments, in place of NVRAM 245, the storage system 120 may include any other type of non-volatile memory (such as flash memory, Magnetic Random Access Memory (MRAM), Phase Change RAM (PRAM), etc.).

The processor 220 executes a storage operating system 300 of the storage system 120 that functionally organizes the storage system by, inter alia, invoking storage operations in support of a file service implemented by the storage system. In some embodiments, the storage operating system 300 comprises a plurality of software layers (including a queuing layer 276) that are executed by the processor 220. In some embodiments, the queuing layer 276 is implemented to optimize access request scheduling for an LLRRM device used as a storage device 135, without requiring code modification of the other layers of the storage operating system 300. The queuing layer 276 may produce and maintain request-queuing data structures 610, 630, and/or 650, and a request-sorting data structure 660 for scheduling access requests for an LLRRM device. Portions of the storage operating system 300 are typically resident in memory 240. It will be apparent to those skilled in the art, however, that other processing and memory means, including various computer readable media, may be used for storing and executing program instructions pertaining to the storage operating system 300.

The storage adapter 250 cooperates with the storage operating system 300 executing on the storage system 120 to access data requested by the server system 110. The data may be stored on the storage devices 125 and 135 that are attached, via the storage adapter 250, to the storage system 120 or other node of a storage system as defined herein. The storage adapter 250 includes input/output (I/O) interface circuitry that couples to the storage devices 125 and 135 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data is formatted into a packet and returned to the server system 110.

In an illustrative embodiment, the primary storage devices 125 may comprise disks that are arranged into a plurality of volumes, each having a file system associated therewith. In one embodiment, the storage devices 125 comprise disks that are configured into a plurality of RAID (redundant array of independent disks) groups whereby multiple primary storage devices 125 are combined into a single logical unit (i.e., RAID group). In a typical RAID group, primary storage devices 125 of the group share or replicate data among the disks which may increase data reliability or performance. The primary storage devices 125 of a RAID group are configured so that some disks store striped data and at least one disk stores separate parity for the data, in accordance with a preferred RAID-4 configuration. However, other configurations (e.g., RAID-5 having distributed parity across stripes, RAID-DP, etc.) are also contemplated. A single volume typically comprises a plurality of primary storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
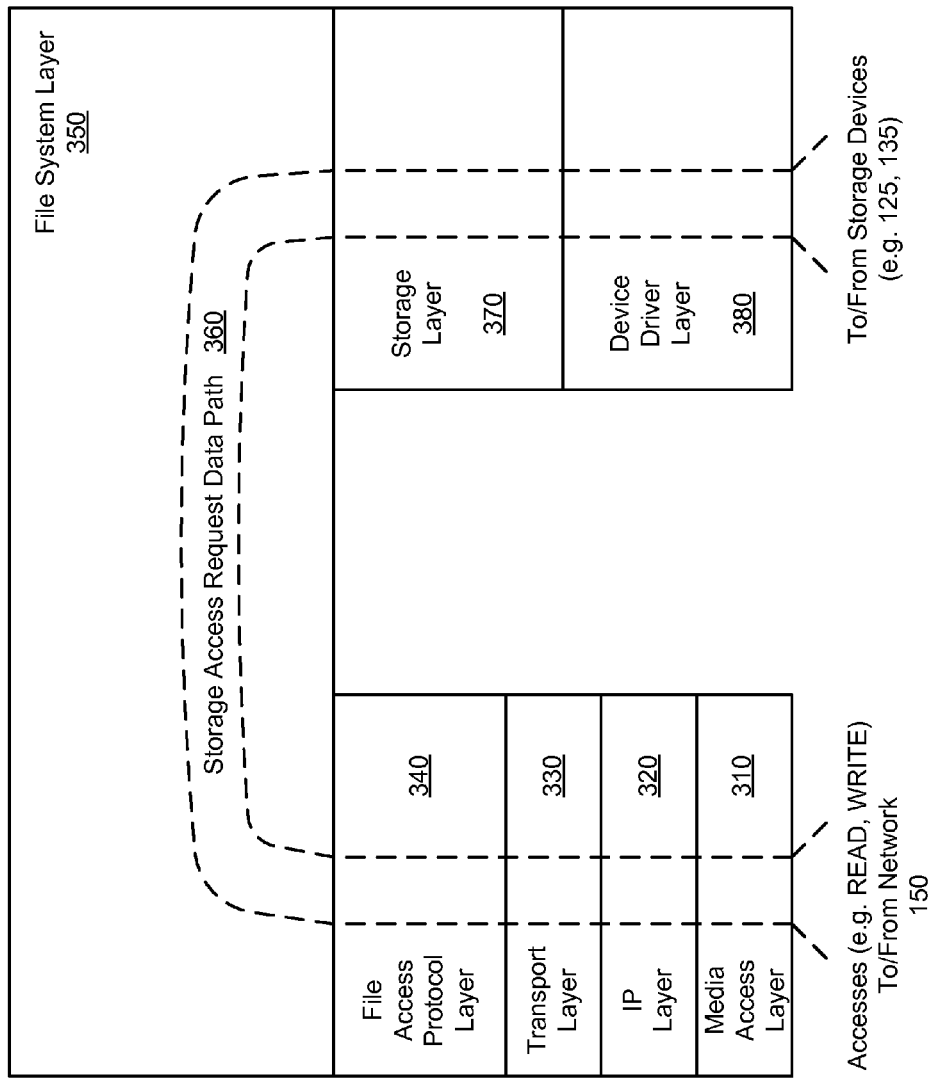
FIG. 3 is a schematic block diagram of an exemplary storage operating system that may be implemented by the storage system of FIG. 2.

As shown in FIG. 3, the storage operating system 300, that comprises a series of software layers that form an integrated protocol stack, that may be implemented by the storage system of FIG. 2. The protocol stack provides data paths 360 for server systems 110 to access data stored on the storage system 120 using file-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A file-access protocol layer 340 provides multi-protocol data access and, for example, may include support for the Hypertext Transfer Protocol (HTTP) protocol, the NFS protocol, and the CIFS protocol. The storage operating system 300 may include support for other protocols, including, but not limited to, the direct access file system (DAFS) protocol, the web-based distributed authoring and versioning (WebDAV) protocol, the Internet small computer system interface (iSCSI) protocol, and so forth. The storage operating system 300 may manage the primary storage devices 125 using a storage layer 370 that implements a storage protocol (such as a RAID protocol) and a device driver layer 380 that implements a device control protocol (such as small computer system interface (SCSI), integrated drive electronics (IDE), etc.).

Bridging the storage device software layers with the network and file-system protocol layers is a file system layer 350 of the storage operating system 300. In an illustrative embodiment, the file system layer 350 implements a file system having an on-disk format representation that is block-based using, for example, 4 KB data blocks. For each data block, the file system layer 350 may assign/associate a unique storage system address (e.g., a unique LBN) for storing data blocks in the set of storage devices. The file system layer 350 also assigns, for each file, a unique inode number and an associated inode. An inode may comprise a data structure used to store information about a file, such as ownership of the file, access permission for the file, size of the file, name of the file, location of the file, etc. Each inode may also contain information regarding the block locations of the file. In some embodiments, the block locations are indicated by LBNs assigned for each block of the file.

In response to receiving a file-access request, the file system generates operations to load (retrieve) the requested data from the storage devices. If the information is not resident in the storage system's memory 240, the file system layer 350 indexes into an inode using the received inode number to access an appropriate entry and retrieve a storage system address (e.g., LBN). The storage system address may then used by the file system layer 350, storage layer 370, and an appropriate driver of the device driver layer 380 to access the requested storage system address from the storage devices. The requested data may then be loaded in memory 240 for processing by the storage system 120. Upon successful completion of the request, the storage system (and storage operating system) returns a response, e.g., a conventional acknowledgement packet defined by the CIFS specification, to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 1 10. Moreover, in a further embodiment, the processing elements of network and storage adapters 210 and 250 may be configured to offload some or all of the packet processing and storage access operations, respectively, from processor 220 to thereby increase the performance of the data access service provided by the storage system.

II. Queuing Layer for LLRRM Devices

A. Queuing Layer Overview

When using LLRRM devices 135 as storage devices, the storage operating system 300 may further implement a remapping layer 275 (that maps/translates storage system addresses to LLRRM addresses) and a queuing layer 276. In some embodiments, the queuing layer 276 operates in conjunction with the other software layers and file system of the storage operating system 300 to use an LLRRM device 135 as a storage device in the storage system 120. In some embodiments, the queuing layer 276 may be pre-included in storage operating system 300 software. In other embodiments, the queuing layer 276 may comprise an external auxiliary plug-in type software module that works with the storage operating system 300 to enhance its functions. In these embodiments, the queuing layer 276 software module may be installed onto a present storage operating system 300 without otherwise requiring code modification of the storage operating system 300. As such, the queuing layer 276 may be imposed upon any existing storage operating system 300 and file system to use an LLRRM device 135 as a storage device.

Figure 4:
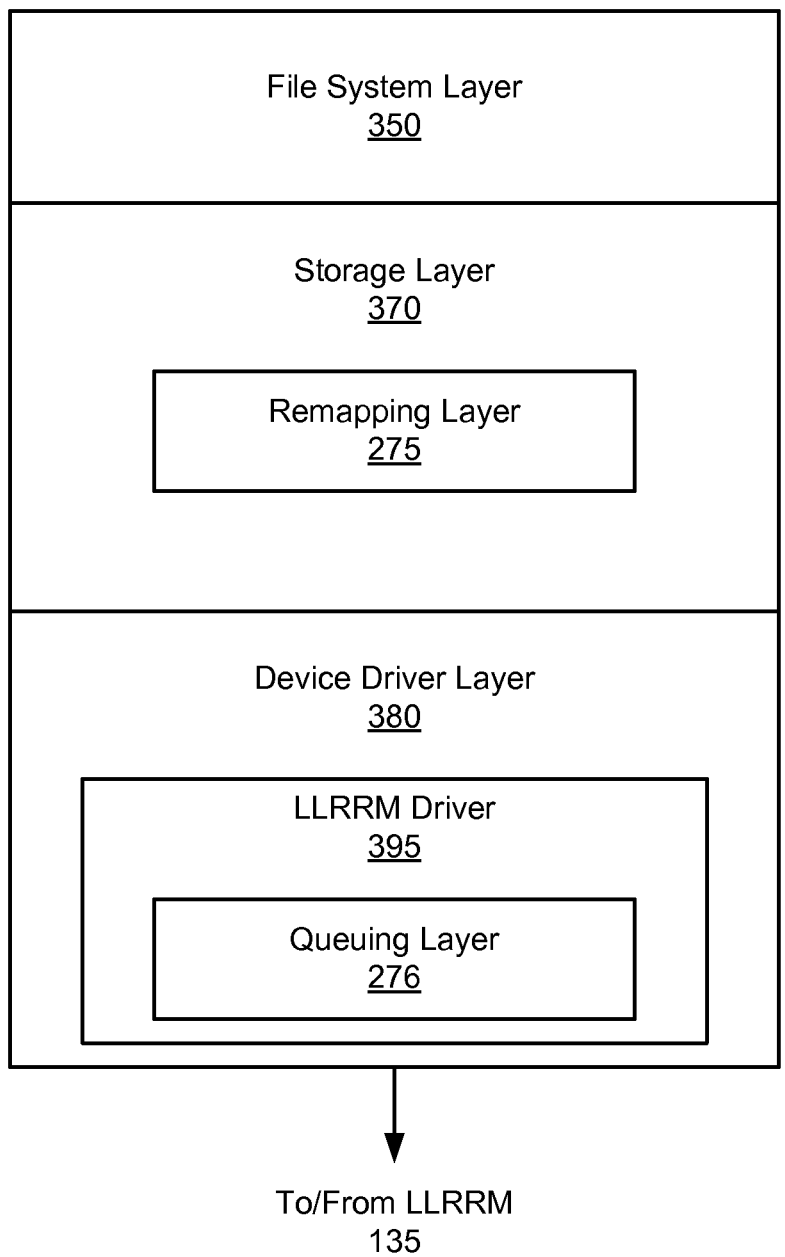
FIG. 4 shows a conceptual diagram showing a queuing layer within the storage operating system.

The remapping layer 275 and queuing layer 276 may reside within or between various software layers of the storage operating system 300. FIG. 4 shows a conceptual diagram of an example where the remapping layer 275 resides within the storage layer 370 and the queuing layer 276 resides within the device driver layer 380 of the storage operating system 300, and more specifically, within an LLRRM Driver 395. In other embodiments, the remapping layer 275 and/or queuing layer 276 resides within or between other software layers of the storage operating system 300. In some embodiments, the queuing layer 276 and/or all or portions of the device driver layer 380 may reside on the LLRRM device 135.

The device driver layer 380 may comprise different device drivers for different devices. When using LLRRM devices 135 as storage devices, the device driver layer 380 may comprise an LLRRM driver 395 configured for processing data access requests for the LLRRM devices 135. For read requests, the device driver layer 380 requests data access to the appropriate data on the LLRRM devices 135 and performs or supervises loads of the requested data to memory 240 for processing by the storage system 120. For write requests, the device driver layer 380 requests data access for the write operation to be performed to the appropriate addresses on the LLRRM devices 135 and performs or supervises transfer of the data to be written from memory 240 to the LLRRM device 135. In some embodiments, the data transfer to/from memory 240 from/to the LLRRM may be executed using a direct memory access (DMA) technique. Upon successful completion of a DMA operation portion of a data access request, the LLRRM driver 395 is notified of the completion. Upon successful completion of the request, the storage operating system returns a response to the server system 110 over the network 150.

The device driver layer 380 may receive access-requests including information regarding a read or write request from the storage layer 370. The access-request information may include, for example, a request descriptor (e.g., request type of read or write, etc.), a storage system address (e.g., address representation as a LBN, etc.), and data size (e.g., number of bytes or number of blocks, etc.). The storage system address may specify a data block address that is the starting point from which data is to be read or written. The data size may specify the amount of data to be read or written starting from the storage system address. For write requests, the device driver layer 380 may also receive as input from the storage layer 370 the data to be written. For read requests, the device driver layer 380 may also receive as input from the storage layer 370 the intended destination within memory 240 for storing the data read from the LLRRM device 135.

As access requests for an LLRRM device 135 may be received by the device driver layer 380 at a faster rate than the LLRRM device 135 may perform the access requests, the device driver layer 380 may comprise a queuing layer 276 for queuing access requests for the LLRRM device 135. Conventionally, as the device driver layer 380 receives access requests, the queuing layer 276 may receive and store requests to a single queue, and send the requests from the single queue to the LLRRM device 135 as the LLRRM device 135 becomes available for performing the next access request. Such conventional queuing of data access requests are simple in implementation and sufficient for LLRRM devices having relatively small storage capacities.

Current LLRRM devices may have multiple memory banks and larger storage capacities, each bank being simultaneously and independently accessible to access data on each bank. At the same time, however, the multiple banks are also typically concatenated or otherwise organized to operate as a single memory device. For example, the data connection/path between the storage operating system 300 and the LLRRM device 135 may typically comprise a serial connection/path where only one access request may be sent from the storage operating system 300 to the LLRRM device 135 at a time. Also, the storage architecture of the LLRRM device may use a single physical memory interface (e.g., a serial interface, a USB bus or a controller interface) to process access requests one at a time (in serial) as received from the storage operating system 300. As such, although each bank may be simultaneously and independently accessible, the use of the multiple banks as a single unified memory device may not leverage performance capabilities of these characteristics if scheduling of access requests sent to the LLRRM device is not implemented efficiently.

For example, substantially limiting performance and increasing latency times of the LLRRM device is when two or more access requests in a row are sent for accessing the same memory bank. This situation can often occur when using a single request queue architecture for sending requests to the LLRRM device, as the order of the requests can typically contain several instances of adjacent requests being sent to the same memory bank. In this case, latency is caused when waiting for the first request to be performed on the memory bank before the second request may start being performed on the same memory bank. In this case, the simultaneous accessibility of other banks (which are waiting idle to process an access request) is not being leveraged.

To exemplify impact on memory performance, consider a read request issued to a single bank of flash memory. It takes about 25 μs latency from the issue of the request until data can begin to be read from the flash memory. It then takes a further 13 μs to read 4 kB of data from the bank of flash memory, thus resulting in an aggregate read rate of about 107 MB/s from the single bank of flash memory. However, if two read requests were issued simultaneously (in parallel) or almost simultaneously (the requests being issued in rapid succession in serial) to two separate banks in succession, it would only take around 25 μs latency until data can begin to be read out from both flash banks, plus 13 μs to read 4 kB from the first bank and another 13 μs to read 4 kB from the second bank, resulting in an aggregate read rate of about 160 MB/s, an increase of around 50% in aggregate read bandwidth.

In some embodiments, the performance capabilities of LLRRM devices having multiple memory banks (being simultaneously and independently accessible) is leveraged by allocating, based on the number of memory banks in the LLRRM device, multiple request queues (request-queuing data structures) for storing and sending requests to the LLRRM device. In these embodiments, each request-queuing data structure is configured for storing requests only for a particular assigned/corresponding memory bank. A request is then sent from each request-queuing data structure in successive/consecutive order, wherein a next sent access request is continually sent from a next request-queuing data structure in successive/consecutive order to the LLRRM device. In this way, the series of requests sent (from the storage operating system 300) to the LLRRM device 135 will comprise requests that will be applied to each memory bank in successive/consecutive order, whereby a next access request in the series is continually for performing on a next memory bank in the plurality of banks. In this way, the situation where two or more access requests are sent in a row (sent consecutively one after the other in time with no other request between them) may be avoided and the idle time of each memory bank may be reduced.

B. Overview of LLRRM Devices

Before discussing scheduling of read and write requests by the queuing layer 276, a brief overview of the storage architecture of multi-bank LLRRM devices 135 is provided. In the embodiments below, the description and terms (e.g., "segment," "page," etc.) commonly applied to flash memory devices may be used. The description and terms used below, however, should not be narrowly construed to apply only to flash memory devices. As such, the below embodiments may be applied to any multi-bank LLRRM device.

Figure 5A:
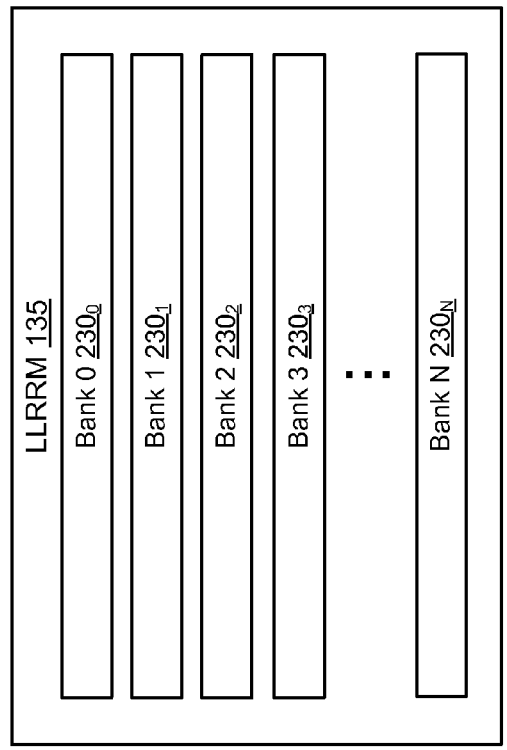
FIG. 5A shows a conceptual diagram of the storage architecture of a multi-bank LLRRM device in which some embodiments operate.

FIG. 5A shows a conceptual diagram of the storage architecture of a generic LLRRM device 135. The LLRRM device 135 may comprise the LLRRM devices 135 shown in FIGS. 1-2. As shown in the example of FIG. 5A, the LLRRM device 135 may comprise a plurality of banks $230_0$, $230_1$, $230_2$, . . . $230_N$, where N is an integer. The LLRRM device 135 provides a "total" storage space spanning a "total" LLRRM address range. Each memory bank 230 may provide a "bank" storage space comprising a sub-set of the total storage space, each bank storage space comprising a "bank" LLRRM address range that comprises a sub-set of the total LLRRM address range.

In some embodiments, each bank 230 and bank LLRRM address range may be accessed independently and concurrently with the accessing of any other bank 230 or bank LLRRM address range. In some embodiments, the multiple banks 230 have adjacent bank LLRRM address ranges that together provide a contiguous LLRRM address range comprising the total LLRRM address range. For example, the total LLRRM address range may comprise range 0 to N, wherein a first bank $230_0$ may comprise bank LLRRM address range 0 to X, second bank $230_1$ may comprise bank LLRRM address range (X+1) to Y, third bank $230_2$ may comprise bank LLRRM address range (Y+1) to Z, nth bank $230_N$ may comprise bank LLRRM address range (Z+1) to N.

The storage space of each bank 230 may also be partitioned/divided into a plurality of segments, each segment comprising a plurality of pages for storing data. Although the terms "segment" and "page" are used in some embodiments, these terms should not be construed narrowly. In general, as used herein, a "segment" may indicate a sub-portion of a bank of an LLRRM device 135, and a "page" may indicate a sub-portion of the storage space of a segment. Each page may have an associated LLRRM address that uniquely identifies the page within the LLRRM device (e.g., comprising an absolute page number within the LLRRM device). In some embodiments, a total or bank LLRRM address range is based on absolute page numbers within the LLRRM device.

Figure 5B:
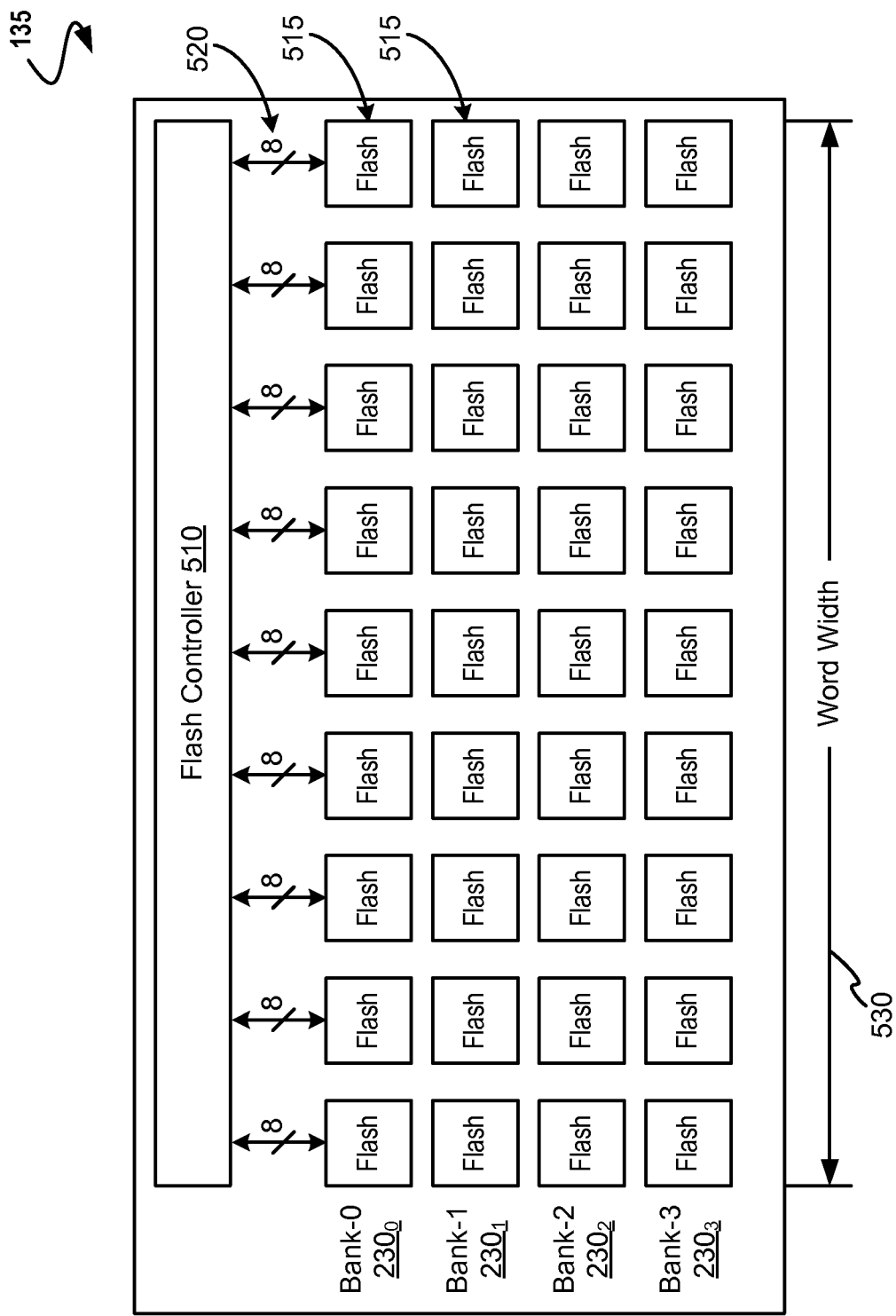
FIG. 5B shows a detailed view of a conceptual diagram of the storage architecture of a multi-bank LLRRM in which some embodiments operate.

FIG. 5B shows a detailed view of a conceptual diagram of an LLRRM device 135, in which some embodiments operate. Although a flash device is described in some embodiments below for illustrative purposes, the embodiments may be applied to other types of LLRRM devices as well. As shown, the LLRRM 135 of FIG. 5B is comprised of a physical memory interface 510 (shown as flash controller 510 for illustrative purposes) connected with a plurality of banks $230_0$, $230_1$, $230_2$, $230_3$, . . . $230_N$. Each bank 230 comprises one or more memory chips (shown as flash chips 515 for illustrative purposes). The one or more memory chips of a bank 230 together provide the overall storage space for the bank (i.e., bank storage space) and the overall address range for the bank (i.e., bank LLRRM address range).

Each bank 230 is independently accessible by the flash controller 510 through independent bus structures between the flash controller 510 and a flash chip 515 within a particular bank 230 (not shown). The bit width 520 (e.g., 8 bits) of each flash chip in each bank is bit-wise concatenated into a word width 530 (e.g., 64 bits of data, plus 8 bits of parity). These examples are purely exemplary, and any bit width (represented herein as "M") and/or word width, with or without parity, can be implemented using flash chips 515.

III. Scheduling Access Requests for a Multi-Bank LLRRM Device

As discussed above, the queuing layer 276 may allocate/assign each bank 230 in the LLRRM device 135 an associated request-queuing data structure (e.g., 610, 630, 650, etc.) for storing access requests only for the assigned bank 230. A request is then sent from each request-queuing data structure in successive/consecutive order, wherein a next sent access request is continually sent from a next request-queuing data structure in successive/consecutive order to the LLRRM device 135. In this way, the series of requests sent (from the storage operating system 300) to the LLRRM device 135 will comprise requests that will be applied to each memory bank in successive/consecutive order to provide efficient processing of the requests by the LLRRM device 135

As discussed above, an access request may specify a storage system address (e.g., logical block number (LBN)). A remapping layer 275 may be used to map the storage system address to a corresponding LLRRM address in the LLRRM device 135. As such, each received access request may comprise a "requested LLRRM address" that is mapped from the storage system address specified in the access request. In some embodiments, a request-sorting data structure 660 is then used to sort/map received access requests to the appropriate request-queuing data structure based on the requested LLRRM address of the access request.

Figure 6:
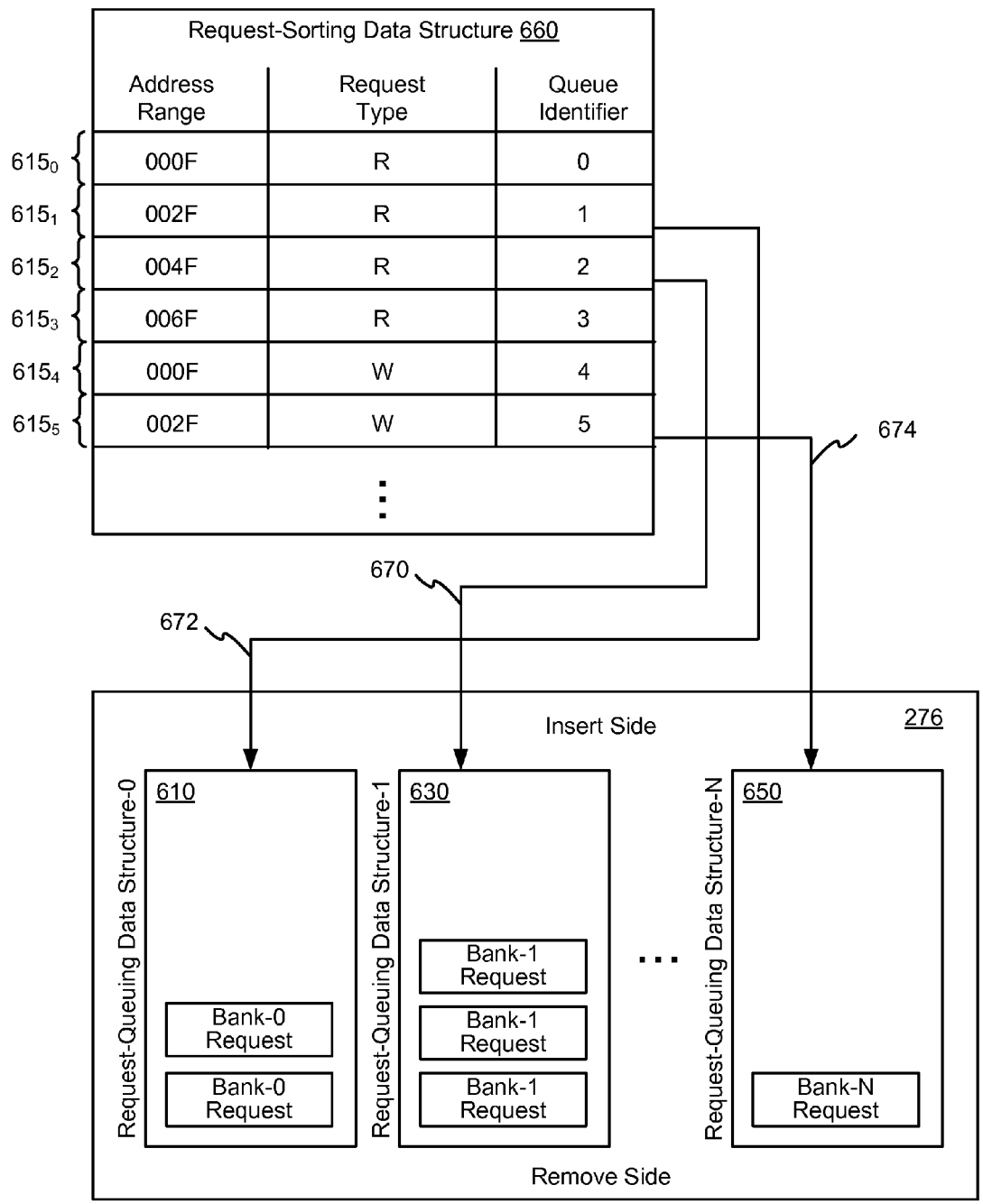
FIG. 6 shows a conceptual diagram of an exemplary request-sorting data structure used in some embodiments.

FIG. 6 shows a conceptual diagram of an exemplary request-sorting data structure 660 used in some embodiments. As shown in FIG. 6, the request-sorting data structure 660 may comprise a plurality of sorting entries $615_0$, $615_1$, $615_2$, $615_3$, $615_4$ representing the plurality of request-queuing data structures. For each request-queuing data structure, a sorting entry 615 may comprise an LLRRM address range field, a request type identifier (read/write identifier) field, and a request-queuing data structure identifier ("queue identifier") field. An LLRRM address range field may specify the LLRRM address range of the bank to which the request-queuing data structure is assigned. An LLRRM address range may be specified in a variety of ways. In the example of FIG. 6, an LLRRM address range of a current entry 615 can be derived from the LLRRM address specified in the current entry and the LLRRM address specified in the next entry.

For each bank in the LLRRM device, the queuing layer 276 may associate a bank identifier that uniquely identifies the bank in the LLRRM device. Likewise, for each request-queuing data structure assigned to a bank in the LLRRM device, the queuing layer 276 may associate a request-queuing data structure identifier ("queue identifier") that uniquely identifies the request-queuing data structure among the plurality of request-queuing data structures allocated for the LLRRM device. For example, the queuing layer 276 may associate bank identifier "0" to the first bank of the LLRRM device and associate queue identifier "0" to the request-queuing data structure assigned to the first bank. As shown, the queue identifier indicated in the data structure 660 is a numeric value (e.g., 1, 2, 3, etc.), however in various embodiments the queue identifier may be a memory pointer, pointing to a request-queuing data structure object (e.g., pointer 670, 672, 674).

As the queuing layer 276 receives access requests for requested LLRRM addresses, it uses the request-sorting data structure 660 to determine which request-queuing data structure to store the access request. The queuing layer 276 may do so by determining an entry 615 (referred to as the matching entry) in the request-sorting data structure 660 that has an LLRRM address range field that encompasses/contains the requested LLRRM address of the request. The queuing layer 276 may then determine the queue identifier in the matching entry to determine the request-queuing data structure in which to store the request. For example, an access request having a requested LLRRM addresses that is contained within the address range field of a matching entry, the matching entry having queue identifier "0", is to be stored to the request-queuing data structure "0" assigned to memory bank "0". As such, each request-queuing data structure 610, 630, 650 may store and queue access requests only for its assigned memory bank. In other embodiments, the request type identifier field of an entry is also used to determine which request-queuing data structure to store a received access request (as described below).

Each access request stored in a request-queuing data structure may contain any or all information comprising a request descriptor, and/or possibly including pointers to memory locations. Such requests may be stored/inserted, for example, into a request-queuing data structure via the insert side, and can be removed via the remove side. In this way, the request-queuing data structure may comprise a first-in-first-out (FIFO) data structure in which data items are inserted into the FIFO from an insert side, and are removed from the FIFO from a remove side. In some embodiments, each request-queuing data structure 610, 630, 650 is produced and maintained by the queuing layer 276.

Figure 7:
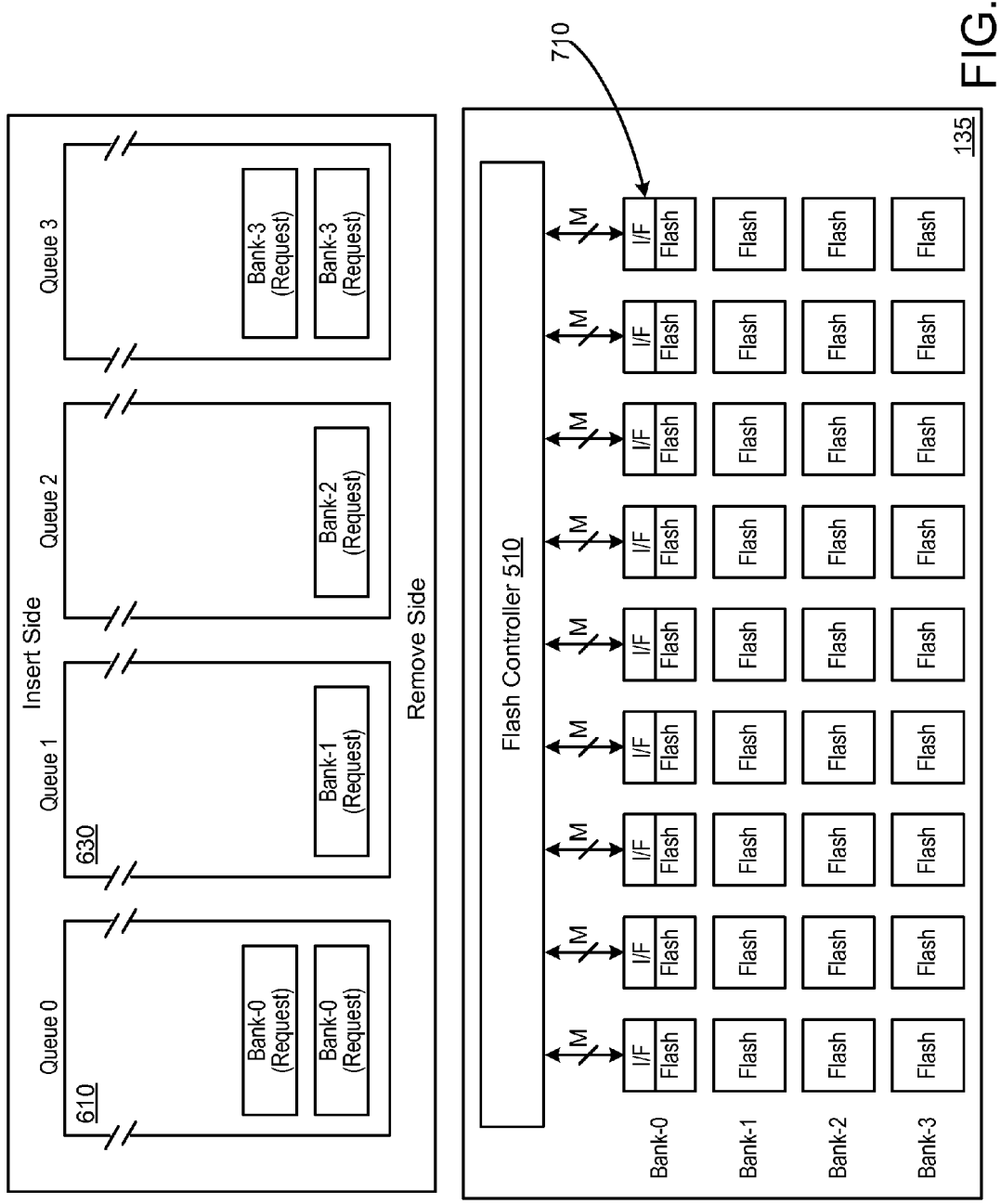
FIG. 7 shows a conceptual diagram of the storage architecture of an LLRRM device using multiple request-queuing data structures, in which some embodiments operate.

FIG. 7 shows a conceptual diagram of an LLRRM device using multiple request-queuing data structures, in which some embodiments operate. As shown, FIG. 7 shows examples of multiple request-queuing data structures queue-0, queue-1, queue-2, and queue-3, together with a depiction of four banks, bank-0, bank-1, bank-2, and bank-3 within an LLRRM 135. In operation within the context of this FIG. 7, the flash controller 510 may communicate with flash chips 515 through an interface 710. The queuing layer 276 may send a request from each request-queuing data structure in successive order to the LLRRM device for processing.

For example, the queuing layer 276 may retrieve a first request that is first visible from the remove side of a first request-queuing data structure (queue-0) and send the first request to the LLRRM device. Note that the first request is for processing by a first bank (bank-0). After sending the first request, the queuing layer 276 may then retrieve a second/next request that is first visible from the remove side of a second/next request-queuing data structure (queue-1) and send the second request to the LLRRM device. Note that the second/next request is for processing by a second/next bank (bank-1). After sending the second request, the queuing layer 276 may then retrieve a third/next request that is first visible from the remove side of a third/next request-queuing data structure (queue-2) and send the third request to the LLRRM device. Note that the third/next request is for processing by a third/next bank (bank-2). If the LLRRM device comprises only three banks, the process would begin again at the first queue where a request is sent from queue 0 for processing on bank-0, and so forth.

The queuing layer 276 may continue to send requests from each request-queuing data structure in successive/consecutive order (from queue 3, queue N, etc.) and then circle/cycle back to the first request-queuing data structure to continue again (e.g., after queue N, begin at queue 0 again), and so forth. As such, the next sent access request is continually sent from a next request-queuing data structure in successive and circular order. In this way, the series of requests sent (from the storage operating system 300) to the LLRRM device 135 will comprise requests that will be applied to each memory bank also in successive and circular order, whereby a next access request in the series is continually for performing on a next memory bank in the plurality of banks.

In this way, the situation where two or more access requests destined for the same bank are sent in a row (sent consecutively one after the other in time with no other request between them) may be avoided and the idle time of each memory bank may be reduced. For example, the flash controller 510 of the LLRRM device may receive the first request and issue the first request for bank-0 by supplying the request descriptor information to the corresponding flash chip interfaces 710 for bank-0. As soon as the first request has been issued to bank-0, and during the time duration for the flash chips of bank-0 to execute the request, bank-0 can be known to be in a busy state (whereby a flash chip at its interface 710 may present a ready/busy indication). During the duration that bank-0 is busy, the flash controller may receive the second request and issue the second request for bank-1. During the time duration for the flash chips of bank-1 to execute the second request, the flash controller 510 may receive and issue the third request for bank-2. As such, the idle time of each memory bank may be reduced.

Figure 8:
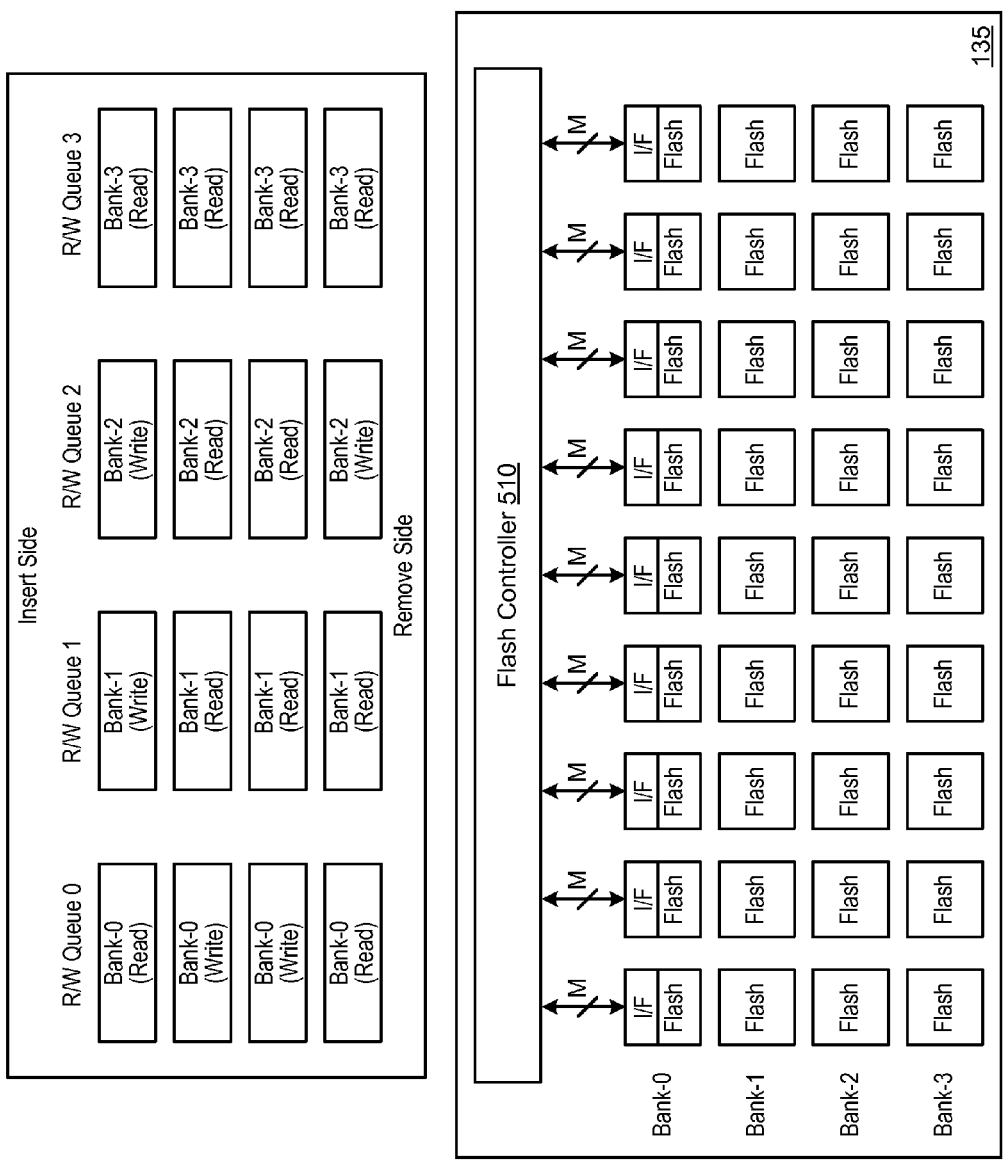
FIG. 8 shows a conceptual diagram of an LLRRM device using request-queuing data structures that may store/queue read or write requests.
Figure 9:
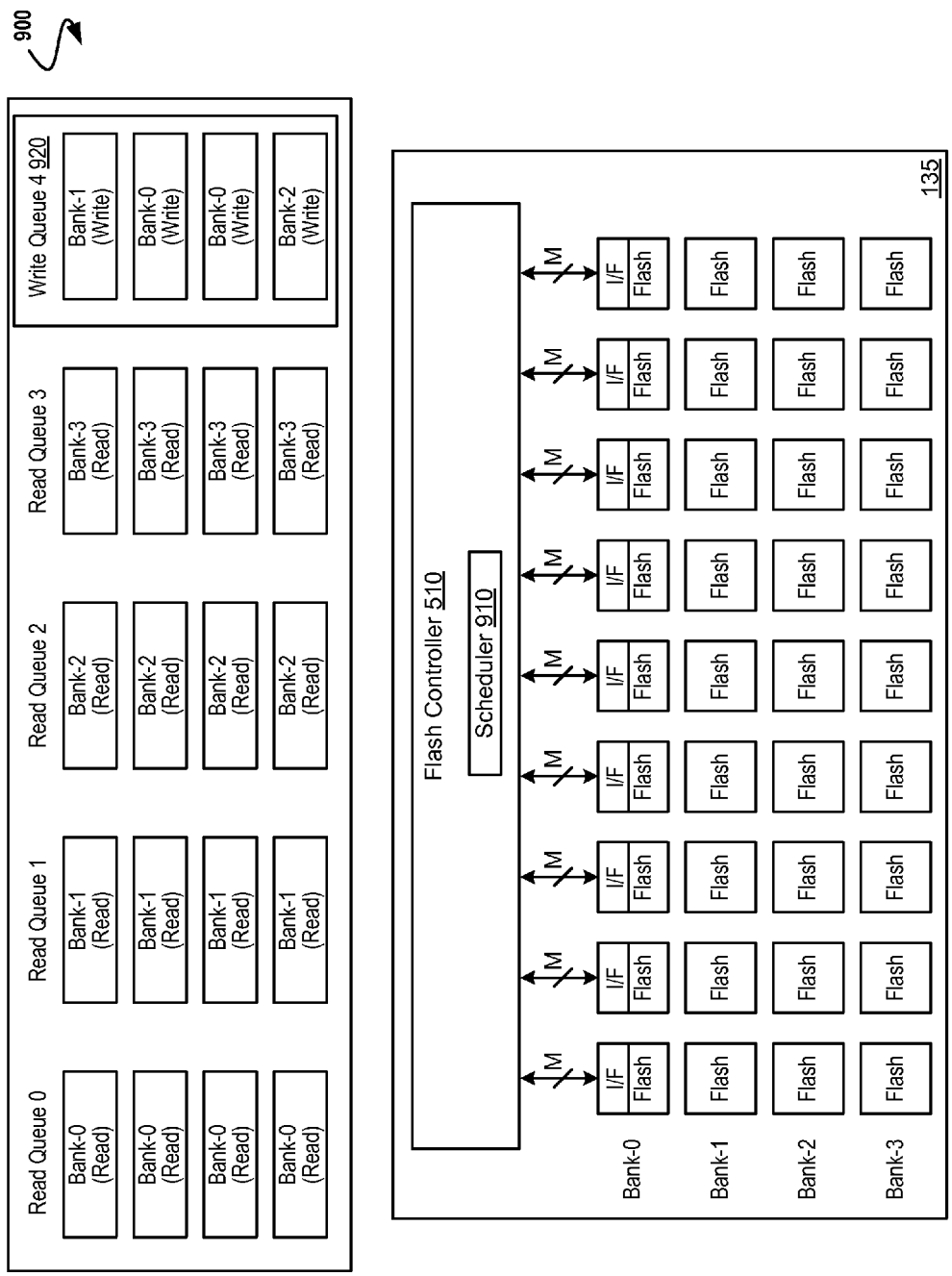
FIG. 9 shows a conceptual diagram of an LLRRM device using multiple request-queuing data structures that may store/queue only a read request and at least one request-queuing data structure that may store/queue only a write request.
Figure 10:
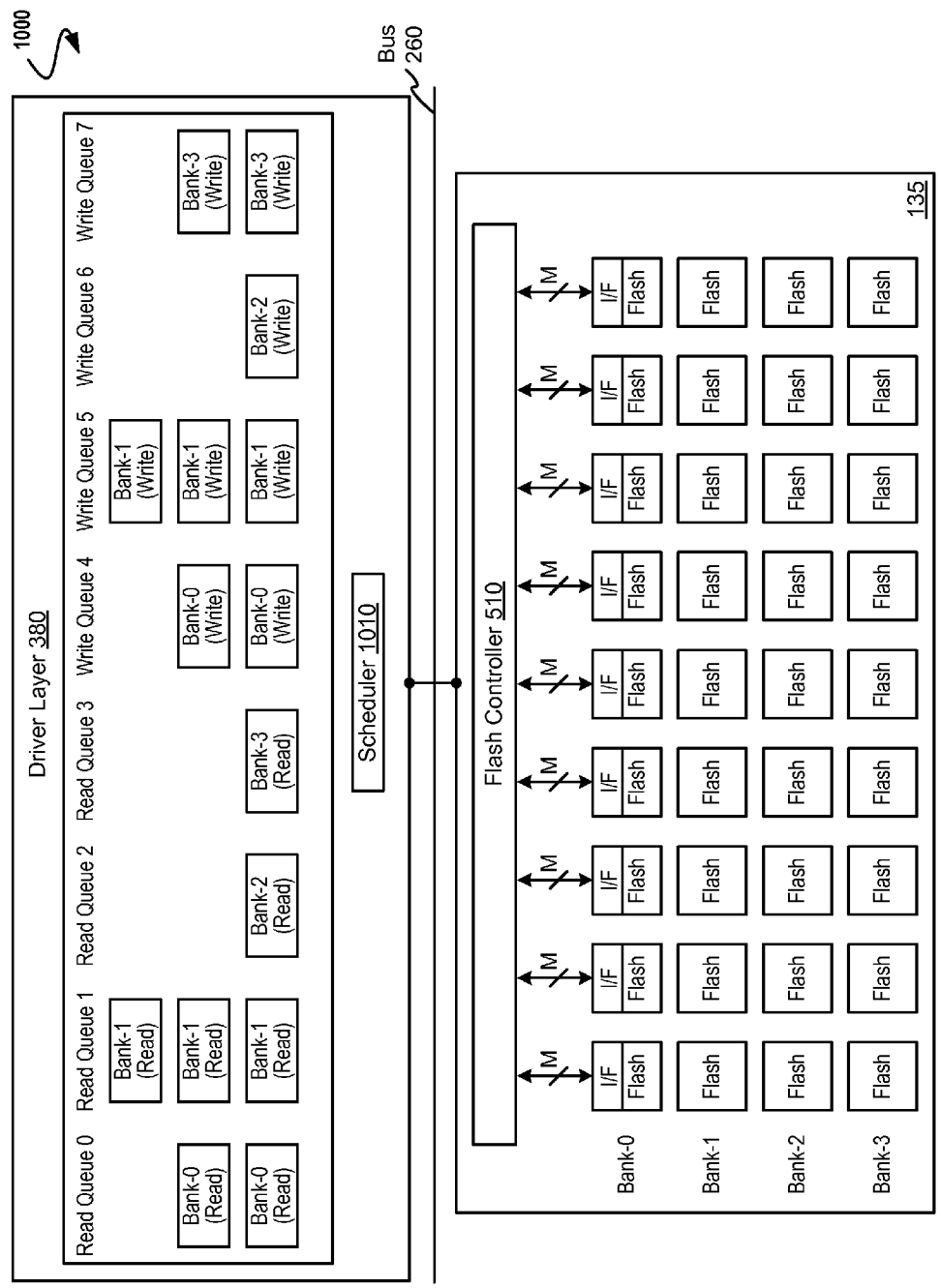
FIG. 10 shows a conceptual diagram of an LLRRM device using multiple request-queuing data structures that may store/queue only a read request and multiple request-queuing data structures that may store/queue only a write request.

FIGS. 8-10 show various configurations of request-queuing data structures for storing/queuing access requests in accordance with some embodiments. FIG. 8 shows a conceptual diagram of an LLRRM device using request-queuing data structures that may store/queue read or write requests. As shown, FIG. 8 is an example of request-queuing data structures in which a request-queuing data structure may contain both a read request and a write request. In the example of FIG. 8, the request-queuing data structures queue-0, queue-1, and queue-2 each contain read and write requests.

However, in general, write requests sent to an LLRRM device 135 may take considerably longer to perform on a bank 230 than read requests. As an example, satisfying a write request comprising a 32 kB block of data issued to a bank 230 may require the following steps: 1) address the flash interface for about 104 μs to transfer write data from the controller 510 into the bank 230; and 2) wait 250 μs for the bank 230 to internally process the write request. As such, the occurrence of a write request in a request-queuing data structure may cause substantial increased latency for any pending read requests in the same request-queuing data structure.

FIG. 9 shows a conceptual diagram of an LLRRM device using multiple request-queuing data structures that may store/queue only a read request and at least one request-queuing data structure 920 that may store/queue only a write request. In the embodiment 900 of FIG. 9, a read request-queuing data structure is allocated/assigned for each bank of the LLRRM device (read queues 0-3 assigned for banks 0-3), each read request-queuing data structure for storing only read requests of the assigned bank. In the example of FIG. 9, one write request-queuing data structure 920 is assigned for all banks of the LLRRM device (write queue 4 assigned for banks 0-3), the write request-queuing data structure for storing only write requests for all assigned banks.

Operation within the embodiment 900 supports sending read requests from any read queues independently of send any write request from the write queue to the LLRRM device 135. The embodiment 900 avoids storing write requests in request-queuing data structures having read requests and causing substantial increased latency for any pending read requests in the same request-queuing data structure. Thus, any read request for any bank can be processed by the LLRRM device with high priority, and without waiting behind high-latency write requests.

In the embodiment 900, the flash controller 510 comprises a scheduler module 910. Such a scheduler 910 may calculate a schedule for issuing requests to banks 230 based on the number of banks, the number of queues (request-queuing data structures), the types of queues (read or write queue), and/or the predicted duration of performing the access request (e.g., based on request type, data size, etc.). In the situation presented in FIG. 9, the scheduler 910 may favor processing read requests (from read queues 0-3), deferring any processing of writes (from write queue 4) until there are no read requests in any read queue, or at least until there are no read requests in any read queue that are ready to be issued to the corresponding bank of flash memory.

Another scheduling possibility includes a weighted round-robin arbitration schedule that processes a programmed number of reads before processing a write request. Other schedules are reasonable and envisioned such that read requests are processed with alacrity in favor of write requests. It is also possible that all read request queues become empty and multiple write requests remain in the write queue 920. In such a case, the write operations in the write queue might be dispatched in turn so long as the bank corresponding to the write request is available. In the example of FIG. 9, this may result in dispatch of the write request to bank-2, immediately followed (i.e., without waiting for completion of the write to bank-2) by the next request in the write queue, namely a write to bank-0. However, it is possible that a write request destined for a free resource is inserted into the write queue behind a write request that cannot be initiated. Such is the case of the bank-1 write request in the write queue 920. This is a situation similar in concept to the scheduling observations that are addressed in the multiple request-queuing data structures for read requests as shown in embodiment of FIG. 7. Thus an approach to write queuing would be to maintain separate write queues for each bank of flash memory such that write requests for issue to separate banks do not wait needlessly behind other operations to other banks.

FIG. 10 shows a conceptual diagram of an LLRRM device using multiple request-queuing data structures that may store/queue only a read request and multiple request-queuing data structures that may store/queue only a write request. In the embodiment 1000 of FIG. 10, a read request-queuing data structure is allocated/assigned for each bank of the LLRRM device (read queues 0-3 assigned for banks 0-3), each read request-queuing data structure for storing only read requests of the assigned bank. In the example of FIG. 10, a write request-queuing data structure 920 is also assigned for each bank of the LLRRM device (write queues 4-7 assigned for banks 0-3), each writerequest-queuing data structure for storing only write requests of the assigned bank. As shown, FIG. 10 is an example of separate request-queuing data structures for separate types of requests and for each bank. In the embodiment 1000, a scheduler module 1010 is included within the driver layer 380 (or included in the LLRRM driver 395). Embodiment 1000 presents a separate read queuing data structure for each bank of the LLRRM 135, plus a separate write queuing data structure for each bank of the LLRRM 135. Operations within this embodiment thus tend to maximize interleaving of writes to different banks for situations in which high write throughput is expected.

As discussed above, the request-sorting data structure 660 is used to sort/map received access requests to the appropriate request-queuing data structure. In the example of FIG. 8, each request-sorting data structure 660 stores read or write requests. As such, when using the embodiment of FIG. 8, only the requested LLRRM address of the received access request and the LLRRM address range field is used to determine a matching entry 615 in the request-sorting data structure 660, the matching entry 615 having the queue identifier of the request-queuing data structure that is to store/queue the received access request.

In the examples of FIGS. 9 and 10, each request-sorting data structure 660 stores only a read request or only a write requests. As such, when using the embodiments of FIG. 9 or 10, the requested LLRRM address of the received access request and the LLRRM address range field as well as the request type identifier (read/write identifier) field is used to determine a matching entry 615 in the request-sorting data structure 660, the matching entry 615 having the queue identifier of the request-queuing data structure that is to store/queue the received access request. As such, a matching entry 615 contains the correct LLRRM address range field and request type identifier combination that matches the received access request.

Figure 11:
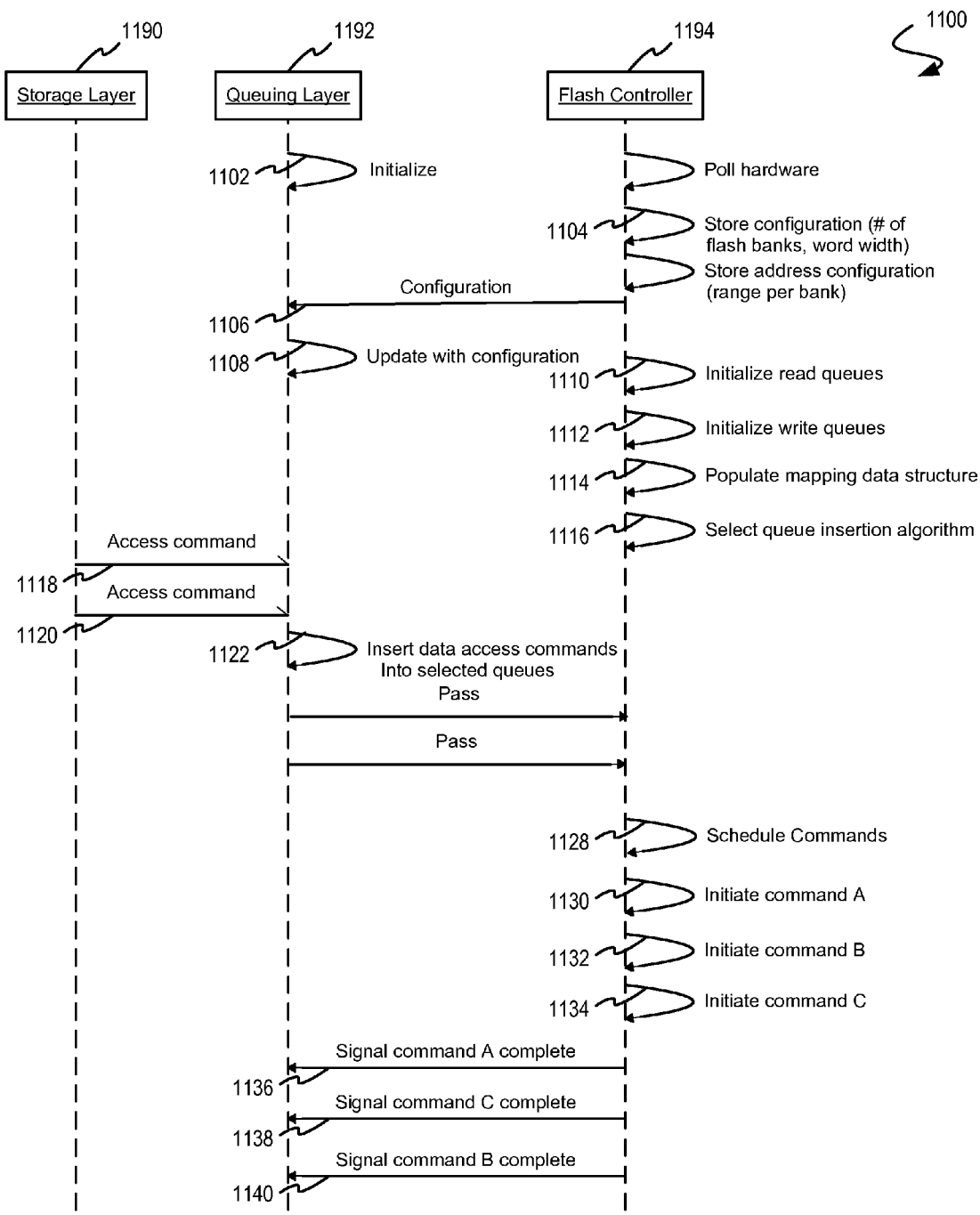
FIG. 11 is a communication protocol for scheduling concurrent access requests within a multi-bank low-latency random read memory device, in which some embodiments operate.

IV. A Messaging and Operation Protocol for Scheduling Access Requests for a Multi-Bank LLRRM Device FIG. 11 is a communication protocol for scheduling concurrent access requests within a multi-bank low-latency random read memory device, in which some embodiments operate. The environment of FIG. 11 includes several operational elements (i.e., storage layer 1190, queuing layer 1192, and flash controller 1194), within which environment a communications protocol may be executed. The embodiment shown is purely exemplary, and might be implemented in the context of one or more of FIG. 1 through FIG. 10. As shown, the elements 1190, 1192, and 1194 cooperate via message exchange and intra-element operations to implement a communications protocol for scheduling concurrent access requests within a multi-bank, low-latency random read memory device. The system 1100 is strictly exemplary and the assignment of operations to specific elements, and also the specific initiator and recipient of the messages, is also strictly exemplary. As shown, the flash controller 1194 polls its own LLRRM hardware and firmware configuration (e.g., to determine the extent of the plurality of flash memory banks) and stores various configuration parameters (see operation 1104). Once known the configuration is passed (see message 1106) to the driver 1192 for driver update of data structures (see operation 1108) including producing a request-sorting data structure specifying LLRRM address ranges associated with each memory bank. In cooperation with the driver, the flash controller continues by allocating a request-queuing data structure for each memory bank in the plurality of memory banks (see operations 1110, and 1112) and populating other data structures (see operations 1114, and 11 16).

As shown, the storage layer sends access requests to the driver (see messages 1118 and 1120), which processes each received access request, using the request-sorting data structure to identify the location for storing the access request in the request-queuing data structure associated with the memory bank determined to have the requested LLRRM address (see operation 1122), and passes the access requests for flash controller insertion of the data access requests into selected queues. The scheduled order is determined as a response to previously scheduled requests (see operation 1128), and the access requests from each request-queuing data structure are initiated (see operations 1130, 1132, and 1134). Of course the operations corresponding to the access requests eventually complete, and the flash controller signals to the driver the completion (see messages 1136, 1138, and 1140).

Figure 12:
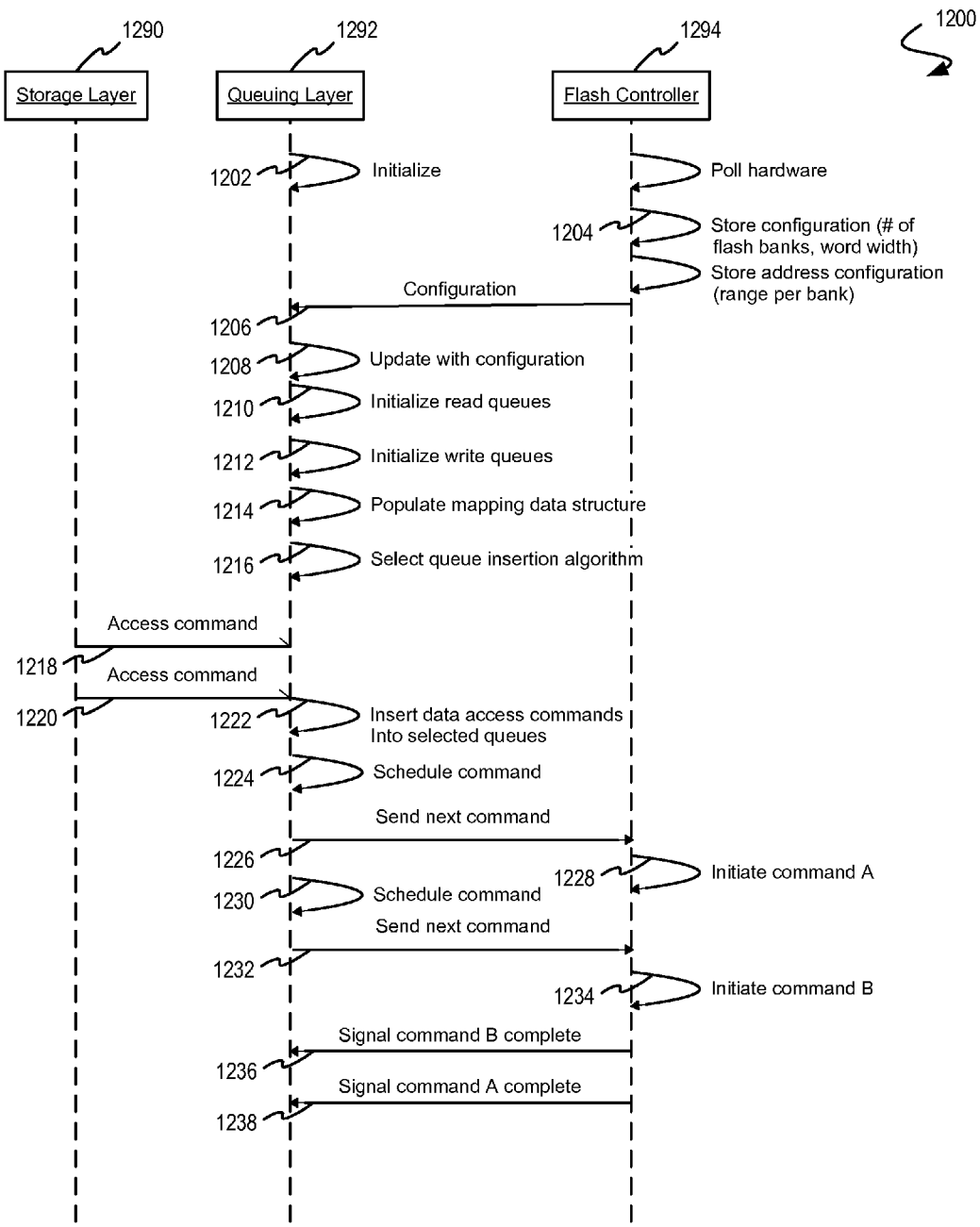
FIG. 12 is a alternative communication protocol for scheduling concurrent access requests within a multi-bank low-latency random read memory device, in which some embodiments operate.

FIG. 12 is a diagrammatic representation of several operational elements (i.e. storage layer 1290, queuing layer 1292, and flash controller 1294) within which environment a communications protocol may be executed. The embodiment shown is purely exemplary, and might be implemented in the context of one or more of FIG. 1 through FIG. 11. As shown, the elements 1290, 1292, and 1294 cooperate via message exchange and intra-element operations to implement a communications protocol for scheduling concurrent access requests within a multi-bank low-latency random read memory device. The system 1200 is strictly exemplary and the assignment of operations to specific elements and also the specific initiator and recipient of the messages is also strictly exemplary. As shown, the protocol 1200 features scheduling techniques (see operations 1216, 1224, and 1230) being performed within the queuing layer. The flash controller polls its own configuration for determining the memory array organization of the LLRRM (see operation 1204).

Having the configuration determined, the flash controller sends the configuration to the queuing layer which in turn performs operations for updating the configuration within the queuing layer (see operation 1208), and further, performs operations for allocating a request-queuing data structure for each memory bank in the plurality of memory banks (see operations 1210, 1212, 1214, and 1216). As shown the operation 1212 is specifically defined for allocating at least one write request-queuing data structure. Similarly operation 1214 is specifically defined for producing a request-sorting data structure specifying LLRRM address ranges associated with each memory bank. At some point in time, the storage layer 1290 sends access request requests asynchronously (see messages 1218 and 1220), which messages might be processed by a remapping layer to remap addresses into LLRRM addresses before reaching the queuing layer 1292. Of course the queuing layer 1292 is configured for receiving a plurality of access requests at requested LLRRM addresses in the LLRRM device, and for each received access request, the queuing layer stores the access request in the request-queuing data structure associated with a memory bank determined to have the requested LLRRM address; that is, using the request-sorting data structure to determine the memory bank corresponding to the request access (see operation 1222).

The scheduler executes (see operation 1224), and a next request to be initiated is sent to the flash controller (see message 1226). In this embodiment, the scheduling operations are performed within the queuing layer, and operations 1222, 1224, 1230, and 1232 are configured for sending, to the LLRRM device for processing, an access request from each request-queuing data structure in a scheduled order, wherein the scheduled order is determined as a response to previously scheduled requests. The flash controller 1294 initiates the received requests (see operations 1228 and 1234), waits for completion of the initiated requests, and signals completion of the corresponding request (see messages 1236 and 1238).

Figure 13:
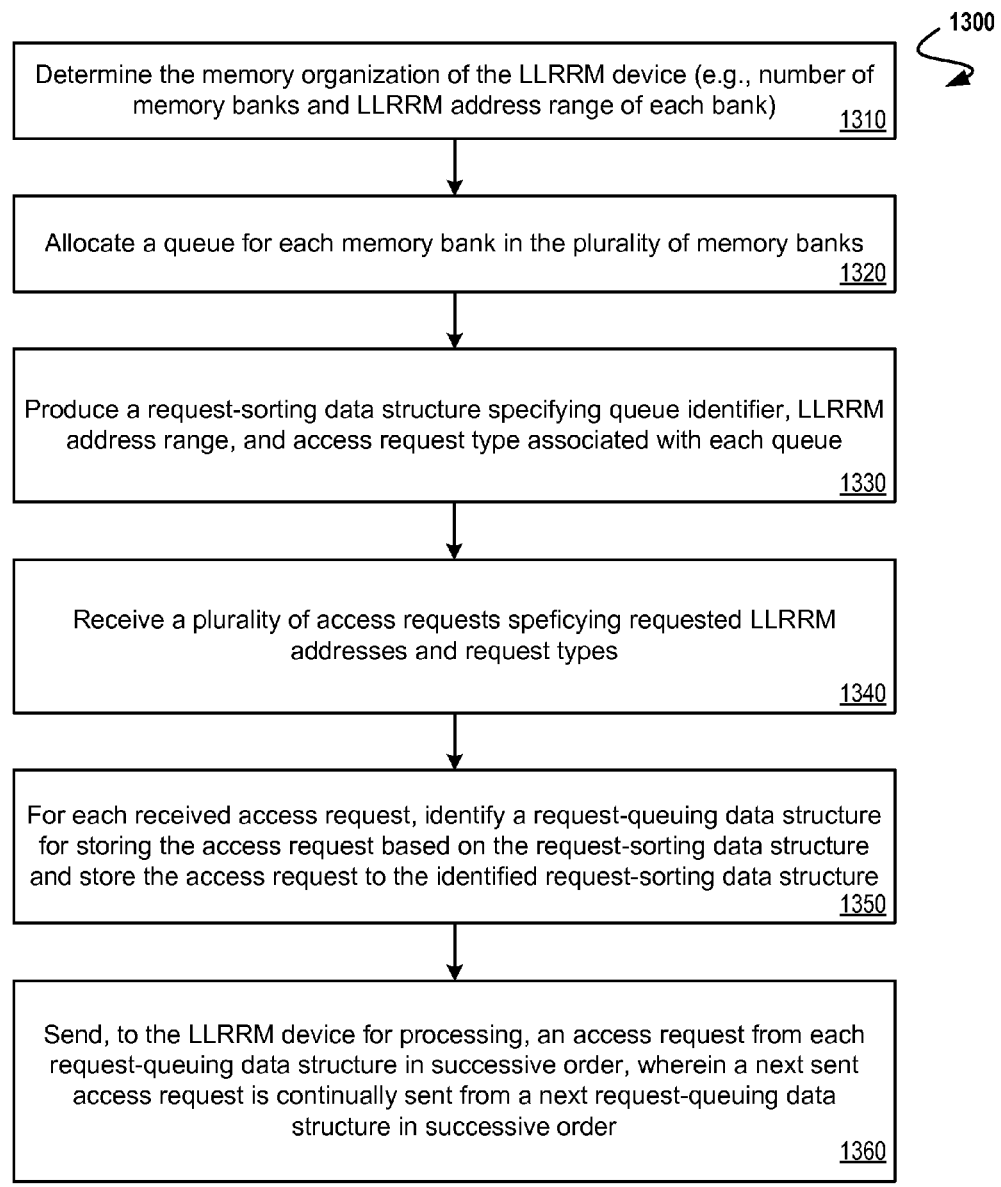
FIG. 13 is a flowchart of a method for scheduling access requests for a multi-bank, low-latency random read memory device, in which some embodiments operate.

FIG. 13 is a flowchart of a method 1300 for scheduling access requests for a multi-bank low-latency random read memory device. In some embodiments, some of the steps of the method 1300 are implemented by software or hardware. In some embodiments, some of the steps of method 1300 are performed by the remapping layer 275 in conjunction with the device driver layer 380 (which includes the LLRRM driver 395 and queuing layer 276), and in conjunction with an LLRRM device 135. The order and number of steps of the method 1300 are for illustrative purposes only and, in other embodiments, a different order and/or number of steps are used.

The method 1300 begins when the memory organization of the LLRRM device 135 is determined (at step 1310) including determining the number of memory banks within the LLRRM 135 and LLRRM address ranges associated with each memory bank. For example, such information may be input to the device driver layer 380 by an administrator or such information may be stored and read from the LLRRM device 135, etc.

The method then allocates/assigns a request-queuing data structure for each memory bank in the plurality of memory banks (at step 1320). In some embodiments, the method assigns one request-queuing data structure for each bank, each request-queuing data structure for storing read and write requests for the assigned bank (as shown in FIG. 8). In other embodiments, the method assigns one read request-queuing data structure for each bank (each read request-queuing data structure for storing only read requests for the assigned bank) and assigns one write request-queuing data structure for all the banks storing only write requests for all the banks (as shown in FIG. 9). In further embodiments, the method assigns one read request-queuing data structure for each bank (each read request-queuing data structure for storing only read requests for the assigned bank) and assigns one write request-queuing data structure for each bank (each write request-queuing data structure for storing only write requests for the assigned bank), as shown in FIG. 10. Note that each bank and each allocated request-queuing data structure ("queue") may have an associated queue identifier, LLRRM address range (associated with the bank to which the queue is assigned), and request type (the type of access requests the queue is to store).

The method step 1330 then produces (at 1330) a request-sorting data structure comprising a plurality of entries 615 for the plurality of allocated request-queuing data structures ("queues"), each entry 615 containing data for a particular bank and queue. For example, an entry 615 may specify a queue identifier, LLRRM address range, and request type associated with a queue. The method then receives (at 1340) a plurality of access requests, each access request comprising request descriptor information specifying a requested LLRRM address and a request type (read or write).

For each received access request, method identifies (at 1350) a request-queuing data structure for storing the access request based on the request-sorting data structure and stores the access request to the identified request-sorting data structure. For example, the request-queuing data structure may be identified using only the requested LLRRM address of the received access request and the LLRRM address range field to determine a matching entry 615 in the request-sorting data structure 660, the matching entry 615 having the queue identifier of the request-queuing data structure that is to store/queue the received access request. As a further example, the request-queuing data structure may be identified using the requested LLRRM address of the received access request and the LLRRM address range field as well as the request type identifier (read/write identifier) field to determine a matching entry 615 in the request-sorting data structure 660, the matching entry 615 having the queue identifier of the request-queuing data structure that is to store/queue the received access request. As such, a matching entry 615 contains the correct LLRRM address range field and request type identifier combination that matches the received access request.

The method 1300 then sends (at step 1360) an access request to the LLRRM device for processing. In some embodiments, an access request is sent from each request-queuing data structure in successive order, wherein a next sent access request is continually sent from a next request-queuing data structure (in the plurality of request-queuing data structures) in successive order. As such, a series of sent access requests are produced, wherein adjacent access requests in the series are sent from different request-queuing data structures in the plurality of request-queuing data structures. In this way, the series of requests sent to the LLRRM device 135 will comprise requests that will be applied to each memory bank in successive/consecutive order, whereby a next access request in the series is continually for performing on a next different memory bank in the plurality of banks. In this way, the situation where two or more access requests are sent in a row to the same bank (i.e., adjacent requests sent consecutively to the same bank) may be avoided and the idle time of the memory banks may be reduced.

Some embodiments may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in when executed (e.g., by a processor) perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, a software module or software layer may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We Claim:

1. A storage system for accessing data on a low-latency random read memory (LLRRM) device, the storage system comprising:
   the LLRRM device comprising a plurality of memory banks, each memory bank having an associated LLRRM address range;
   a storage operating system engine configured for:
      allocating a plurality of request-queuing data structures, each request-queuing data structure being assigned to a memory bank in the plurality of memory banks and being associated with the LLRRM address range of the assigned memory bank;
      receiving a plurality of access requests at requested LLRRM addresses in the LLRRM device, each access request comprising a read request or write request;
      for each received access request, storing the access request in a request-queuing data structure, the plurality of request-queuing data structures comprises a plurality of read request-queuing data structures for storing read requests and at least one write request-queuing data structure for storing write requests;
      sending, to the LLRRM device, a series of access requests comprising an access request from each read request-queuing data structure in successive order from a first read request-queuing data structure to a last read request-queuing data structure and continuing again from the first read request-queuing data structure until no read requests remain;
      sending to the LLRM device any access requests from the at least one write request-queuing data structure; and
   a serial connection between the storage operating system engine and the LLRRM device for sending the series of access requests to the LLRRM device.

2. The storage system of claim 1, wherein access to the plurality of memory banks is controlled by a single memory controller that receives the series of access requests.

3. The storage system of claim 1, wherein access to the plurality of memory banks is controlled by a memory controller that receives and processes access requests in serial.

4. The storage system of claim 1, wherein only one access request at a time is sent from the storage operating system engine to the LLRRM device through the serial connection.

5. The storage system of claim 1, wherein the LLRRM device is configured for:
receiving the series of access requests from the storage operating system engine; and
performing each received access request on a memory bank determined by the requested LLRRM address, wherein the series of access requests are performed on successive memory banks in the plurality of memory banks.

6. The storage system of claim 1, wherein the LLRRM device is configured for:
receiving the series of access requests from the storage operating system engine; and
performing the series of access requests on successive memory banks from a first memory bank to a last memory bank in the plurality of memory banks, and continuing again from the first memory bank.

7. A method for storing data on a low-latency random read memory (LLRRM) device comprising a plurality of memory banks, each memory bank having an associated LLRRM address range, the method comprising:
allocating a plurality of request-queuing data structures, each request-queuing data structure being assigned to a memory bank in the plurality of memory banks and being associated with the LLRRM address range of the assigned memory bank;
receiving a plurality of access requests at requested LLRRM addresses in the LLRRM device, each access request comprising a read request or write request;
for each received access request, storing the access request in a request-queuing data structure, the plurality of request-queuing data structures comprises a plurality of read request-queuing data structures for storing read requests and at least one write request-queuing data structure for storing write requests;
sending, to the LLRRM device, a series of access requests comprising an access request from each read request-queuing data structure in successive order from a first read request-queuing data structure to a last read request-queuing data structure and continuing again from the first read request-queuing data structure until no read requests remain; and
sending to the LLRM device any access requests from the at least one write request-queuing data structure, wherein the series of access requests are sent to the LLRRM device using a serial connection.

8. The method of claim 7, wherein access to the plurality of memory banks is controlled by a single memory controller that receives the series of access requests.

9. The method of claim 7, wherein access to the plurality of memory banks is controlled by a memory controller that receives and processes access requests in serial.

10. The method of claim 7, wherein only one access request at a time is sent to the LLRRM device through the serial connection.

11. The method of claim 7, wherein the LLRRM device is configured for:
receiving the series of access requests; and
performing each received access request on a memory bank determined by the requested LLRRM address, wherein the series of access requests are performed on successive memory banks in the plurality of memory banks.

12. The method of claim 7, wherein the LLRRM device is configured for:
receiving the series of access requests; and
performing the series of access requests on successive memory banks from a first memory bank to a last memory bank in the plurality of memory banks, and continuing again from the first memory bank.

13. A non-transitory computer readable medium having instructions stored thereon when executed by a processor, store data on a low-latency random read memory (LLRRM) device comprising a plurality of memory banks, each memory bank having an associated LLRRM address range, the non-transitory computer readable medium comprising instructions for:
allocating a plurality of request-queuing data structures, each request-queuing data structure being assigned to a memory bank in the plurality of memory banks and being associated with the LLRRM address range of the assigned memory bank;
receiving a plurality of access requests at requested LLRRM addresses in the LLRRM device, each access request comprising a read request or write request;
for each received access request, storing the access request in a request-queuing data structure, the plurality of request-queuing data structures comprises a plurality of read request-queuing data structures for storing read requests and at least one write request-queuing data structure for storing write requests;
sending, to the LLRRM device, a series of access requests comprising an access request from each read request-queuing data structure in successive order from a first read request-queuing data structure to a last read request-queuing data structure and continuing again from the first read request-queuing data structure until no read requests remain; and
sending to the LLRM device any access requests from the at least one write request-queuing data structure, wherein the series of access requests are sent to the LLRRM device using a serial connection.

14. The non-transitory computer readable medium of claim 13, wherein access to the plurality of memory banks is controlled by a single memory controller that receives the series of access requests.

15. The non-transitory computer readable medium of claim 13, wherein access to the plurality of memory banks is controlled by a memory controller that receives and processes access requests in serial.

16. The non-transitory computer readable medium of claim 13, wherein only one access request at a time is sent to the LLRRM device through the serial connection.

17. The non-transitory computer readable medium of claim 13, wherein the LLRRM device is configured for:
receiving the series of access requests; and
performing each received access request on a memory bank determined by the requested LLRRM address, wherein the series of access requests are performed on successive memory banks in the plurality of memory banks 18. The non-transitory computer readable medium of claim 13, wherein the LLRRM device is configured for:
  receiving the series of access requests; and
  performing the series of access requests on successive memory banks from a first memory bank to a last memory bank in the plurality of memory banks, and continuing again from the first memory bank.

* * * * *